United States Patent
Leczo et al.

Patent Number: 5,377,960
Date of Patent: Jan. 3, 1995

[54] OXYGEN/CARBON BLOWING LANCE ASSEMBLY

[75] Inventors: Theodore J. Leczo, Wexford; Nicholas M. Rymarchyk, Jr., Baden; Gary S. Bugar, Ellwood City, all of Pa.

[73] Assignee: Berry Metal Company, Harmony, Pa.

[21] Appl. No.: 24,422

[22] Filed: Mar. 1, 1993

[51] Int. Cl.$^6$ ............................................. C21C 5/32
[52] U.S. Cl. ................................. 266/225; 266/265
[58] Field of Search .................. 266/225, 265; 138/155

[56] References Cited

U.S. PATENT DOCUMENTS

| | | | |
|---|---|---|---|
| 645,205 | 3/1900 | Hawkins | 75/525 |
| 1,613,461 | 1/1927 | Johnson | 138/155 |
| 2,546,337 | 3/1951 | Gibson | 138/155 |
| 2,614,585 | 10/1952 | Wagstaff | 138/155 |
| 2,902,358 | 9/1959 | Kalling et al. | 75/60 |
| 2,991,173 | 7/1961 | Trentini et al. | 266/225 |
| 3,212,880 | 10/1965 | Rinesch | 75/552 |
| 3,260,591 | 7/1966 | Brown, Jr. et al. | 266/216 |
| 3,331,680 | 7/1967 | Leupold | 75/53 |
| 3,393,997 | 7/1968 | Faste | 75/59 |
| 3,406,027 | 10/1968 | Kindelan Y Gomez De Bonilla et al. | 75/51 |
| 3,567,202 | 3/1971 | Mercatoris et al. | 266/225 |
| 3,592,363 | 7/1971 | Stout | 266/225 |
| 3,617,897 | 11/1971 | Sandberg et al. | 75/527 |
| 3,681,049 | 8/1972 | Celada | 75/12 |
| 3,722,873 | 3/1973 | Von Haumeder et al. | 266/225 |
| 3,823,012 | 7/1974 | Johnstone et al. | 75/533 |
| 4,089,677 | 5/1978 | Spenceley et al. | 266/255 |
| 4,175,732 | 11/1979 | Jaquay | 266/213 |
| 4,192,490 | 3/1980 | Nilsson et al. | 266/225 |
| 4,247,324 | 1/1981 | Guarino et al. | 266/225 |
| 4,365,992 | 12/1982 | Sieckman | 75/552 |
| 4,385,753 | 5/1983 | Leroy et al. | 266/268 |
| 4,426,224 | 1/1984 | Shimme et al. | 266/268 |
| 4,432,534 | 2/1984 | Zanetta et al. | 266/225 |
| 4,434,005 | 2/1984 | Metz et al. | 75/552 |
| 4,533,124 | 8/1985 | Mercatoris | 266/225 |
| 4,541,866 | 9/1985 | Meyer | 266/216 |
| 4,575,393 | 3/1986 | Bates et al. | 266/225 |
| 4,639,269 | 1/1987 | Hilbrans et al. | 266/225 |
| 4,707,183 | 11/1987 | Michard et al. | 75/10.22 |
| 4,740,241 | 4/1988 | LaBate | 266/225 |
| 4,746,103 | 5/1988 | Takashiba et al. | 266/225 |
| 4,986,847 | 1/1991 | Knapp et al. | 75/525 |

*Primary Examiner*—Scott Kastler
*Attorney, Agent, or Firm*—Reed Smith Shaw & McClay

[57] ABSTRACT

An oxygen/carbon blowing lance assembly for directing a supersonic flow of oxygen and a flow of graphite against the surface of molten bath in a steelmaking electric furnace. The two flows impinge upon the slag surface at discrete separate areas in the slag and the supersonic oxygen flow acts to emulsify the slag. The lance assembly includes a coolant shut off valve to prevent loss of coolant upon failure of the nozzle. The housing of the lance assembly includes a modular design for ease of maintenance.

7 Claims, 2 Drawing Sheets

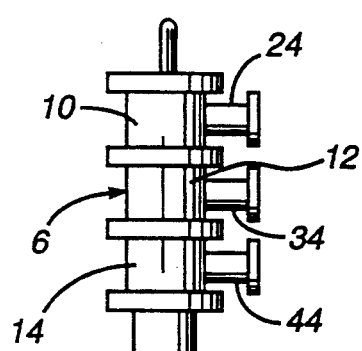
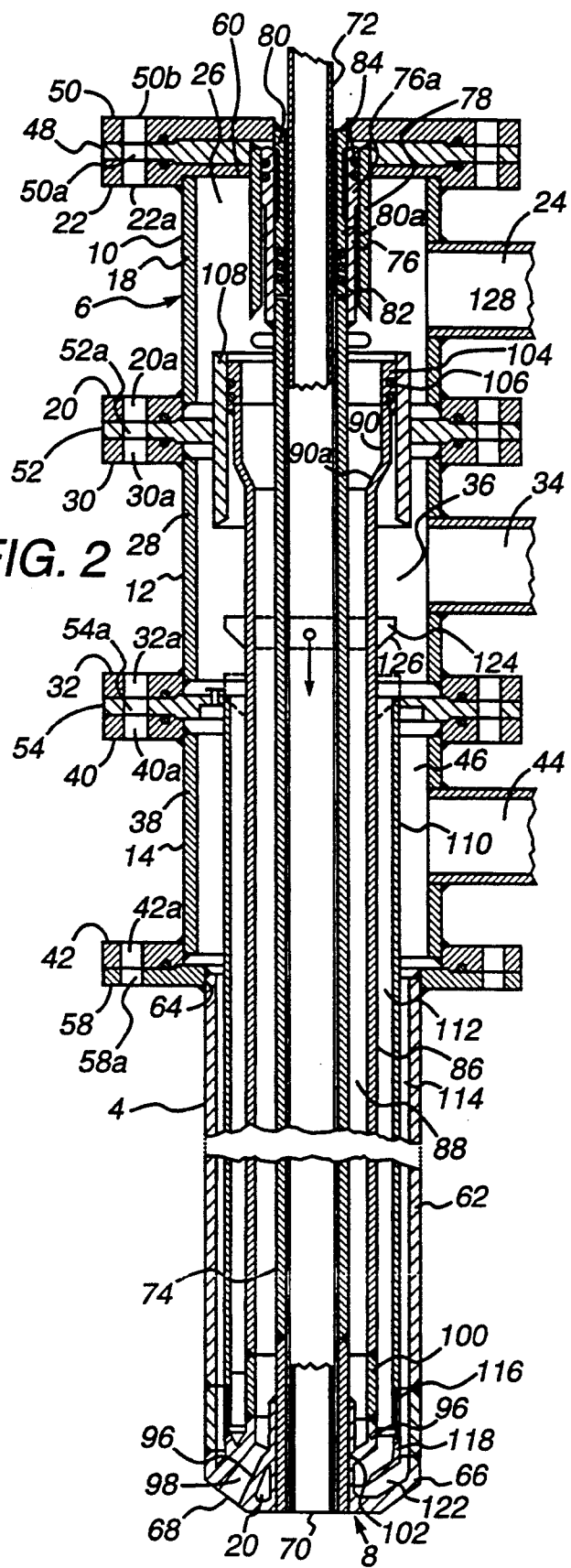

OXYGEN/CARBON BLOWING LANCE ASSEMBLY

BACKGROUND OF THE INVENTION

1. Field of the Invention

This invention relates in general to steelmaking and more particularly, to a oxygen/carbon blowing lance assembly for use in high temperature electric furnaces.

2. Description of Prior Art

In the art of steelmaking, oxygen lance assemblies have long been used to increase the productive capacity of electric furnaces through the introduction of oxygen directly against the molten bath. The oxygen nozzle of the, lance assembly can be combined with a nozzle for introducing a flow of fine-grain solid material in a form of a metallurgical agent, such as carbon, lime, and/or other metallurgical agents Of many forms, for further enhancement of the steelmaking process dependent on desired results. The extreme conditions existing in a high temperature furnace subject the lance assemblies to deteriorating affects requiring part replacement at given intervals. Prior art designs have heretofore attempted to make improvements in the repair of the lances through enhanced removeability and replaceability of parts where necessary. Although prior art designs have improved such serviceability, known lances do not provide a modularized structure which permits interchangeability of certain parts of the lance assembly for lower maintenance and economy of repair. In addition, the deteriorating environment to which a lance assembly is exposed often causes failure and separation of the nozzle structure from the barrel to direct cooling fluid, such as water, into the molten bath with detrimental results. None of the lance designs heretofore used has effectively provided an immediate shut off of the coolant upon failure of the nozzle structure at the end of the barrel of the lance assembly.

One objective in attempting to improve the efficiency of the production of steel in an electric furnace is to cause an increase in the volume of the slag that normally forms on the surface of the molten bath. It is beneficial that slag volume be increased during the steelmaking process to increase the efficiency of the electric furnace and to combine with the impurities from the steel. For these reasons, it is desirable to provide an improved lance assembly capable of delivering oxygen and carbon or other fine-grain solids in a manner to increase volume of the slag and to attain beneficial chemical reaction for increasing productive capacity.

SUMMARY OF THE INVENTION

It is therefore an objective of the invention to provide a improved oxygen/carbon blowing lance assembly for introducing a flow of oxygen and fine-grain solid material, such as carbon and the like, into a molten bath. The oxygen is delivered to the slag layer at a supersonic flow rate by the lance assembly of the invention with penetration to form a surface wave pattern and an emulsified spray of slag. The wave pattern resulting from the impact of the oxygen reduces temperature stratification in the bath and homogenizes the molten metal. Excess oxygen from the dimple formed at the penetration area in the slag spreads to combine with the injected carbon and form carbon monoxide and then carbon dioxide. The "foaming" condition of the slag along with the chemical reaction between the excess oxygen and carbon as attained by the invention increase electrical efficiency between the electrodes of the electric furnace and the molten steel bath. In addition, the action of the oxygen and carbon combines with impurities and insures capture of silicon oxide, phosphorus and the like for a more pure steel product.

The design of the oxygen/carbon lance assembly of the invention attains highly predictable results because the oxygen and carbon are injected with precision at a predetermined area of the molten bath during use. Moreover, the carbon and oxygen are introduced into the central area of the furnace in the most reactive zone of the steel bath at closest proximity with the delta of the electrodes to insure greater efficiency.

The foregoing benefits of the invention are attained by a "hands-off" technique to reduce production costs. The lance assembly herein disclosed also includes certain improvements for making repairs and preventing undesirable introduction of coolant fluid into the molten bath upon failure of the nozzle structure during service. The lance assembly of the invention possesses a novel shut off valve, such that upon the nozzle structure separating or being burnt off the barrel due to deteriorating conditions in the electric furnace, the coolant is internally confined within the lance assembly in a manner that a minimal amount of water escapes into the molten bath. Further, the upper housing of the lance assembly is constructed with a plurality of module sections that are interchangeable with each other. The module sections thereby can easily be replaced by a single part capable of replacing any of the plurality of module elements forming the manifold housing. Such a modular design simplifies repair and reduces maintenance costs.

BRIEF DESCRIPTION OF THE DRAWINGS

FIG. 1 is a side elevational view, with parts removed, of a first embodiment of the oxygen/carbon blowing lance assembly of the invention;

FIG. 2 is a side elevational view, with parts in section, taken along the longitudinal center line of the lance assembly of FIG. 1.

DESCRIPTION OF THE PREFERRED EMBODIMENTS

Figure 3:
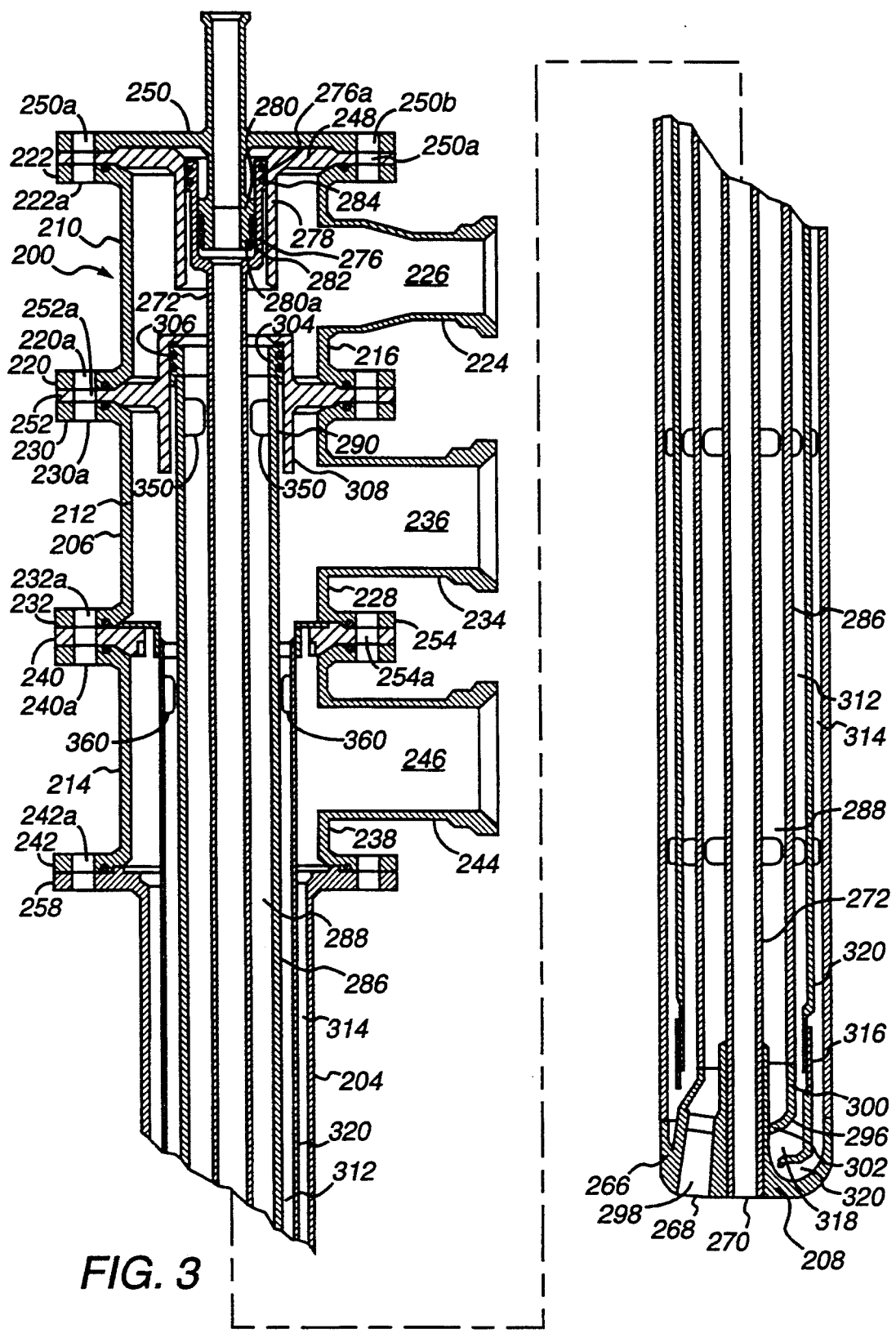
FIG. 3 is a side elevational view, with parts removed of a second embodiment of the invention.

Referring to FIGS. 1 and 2, there is illustrated a first embodiment of the improved oxygen/carbon blowing lance assembly of the invention, generally designated by reference numeral 2. The lance assembly 2 includes an elongated hollow metal barrel 4 mounted in fluid communication with a metal housing assembly 6. An oxygen/carbon injection nozzle structure 8 is suitably supported at the opposite end of the barrel 4. The housing assembly 6 includes three substantially identical modular housing sections 10, 12, and 14. The housing element 10 includes a metal cylindrical pipe section 18 having a pair of annular plates 20 and 22 mounted by welding at each end. The plates 20 and 22 form annular projecting flanges in which a plurality of bolt holes 22a, 20a are concentrically arranged about the pipe section. A laterally arranged oxygen inlet pipe 24 is welded to the wall of pipe section 18 in fluid communication with the chamber 26 formed by the pipe section 18.

Similarly, the housing section 12 is formed by a metal pipe section 28 having a pair of annular plates 30 and 32 welded at each end. A water coolant inlet pipe 34 is laterally affixed to the pipe section 28 and is in fluid communication with the chamber 36 formed by pipe section 28. In addition, housing section 14 includes a metal pipe section 38 having a pair of annular plates 40 and 42 suitably welded at each end. The annular plates 30 and 32 of housing section 12 include a plurality of bolt openings 30a and 32a circumferentially arranged about the pipe section 38. The annular plates 40 and 42 of housing section 14 also include a plurality of bolt holes 40a, 42a circumferentially arranged about the pipe section 38. A lateral coolant outlet pipe 44 is affixed to the pipe section 38 in fluid communication with the chamber 46 formed by the housing section 14.

The base plate 22 of housing section 10 is affixed to a pair of annular plates 48 and 50 each having bolt holes 50a and 50b arranged to be in alignment with bolt hole 22a for affixing annular plates 22, 48, and 50 in contacting relationship through suitable fastener elements, such as bolt assemblies (not shown). An annular plate 52 is sandwiched between the flanges formed by plates 20 and 30 at the interface between housing sections 10 and 12 and includes a plurality of bolt holes 52a in alignment with bolt holes 20a and 30a for receiving fastener elements, such as bolt assemblies (not shown). An additional annular plate 54 is imposed between the flanges formed by annular plates 32 and 40 at the interface between housing sections 12 and 14 and possesses bolt holes 54a in alignment with bolt holes 32a and 40a for affixing the three plates together by suitable fastener elements, such as a bolt assembly (not shown). The annular plate 42 is affixed to an annular plate 58 that is welded to the end of barrel 4. The plate 58 possesses concentrically arranged bolt holes 58a disposed in alignment with bolt holes 42a for receiving fastener elements, such as bolt assembly (not shown), to affix annular plate 42 to the barrel plate 58. From the foregoing it should be apparent that the diameter of the pipe sections 18, 28, and 38 are identical to each other and that the plates 20, 22, 30, 32, 40, and 42 are substantially identical in construction and configuration except that end annular plate 22 at the base includes a portion 60 which extends farther into the pipe section 18 than the remaining annular plates 20, 30, 32, 40, and 42.

The barrel 4 comprises an elongated metal pipe 62 having a diameter less than the diameter of pipe section 38 of the manifold section 14 and is welded to the internal edge 64 of the housing plate 58. A nozzle structure 66 is affixed to the free end of barrel 4 and forms an oxygen injection nozzle outlet 68 and a carbon injection outlet 70. A carbon injection conduit 72 extends the length of the lance assembly 2 from a point beyond top plate 50 to the nozzle outlet 70 along the longitudinal center line of the upper housing assembly 6 and the barrel 4. A pipe 74 concentrically surrounds the carbon conduit 72 from a point within pipe section 18 of the housing section 10 to the end of the lance outlet 70. The end of pipe 74 within housing section 10 is affixed by welding to an internal sleeve 76 which is capable of relative movement within an outer sleeve 78. The outer sleeve 78 is welded in fixed position on annular plate 48 and extends into housing chamber 26 to a position slightly beyond the end of pipe 74. A third sleeve 80 is concentrically disposed within internal sleeve 76 and in surrounding relationship to carbon conduit 72 in fixed welded support on annular plate 50. The sleeve 80 includes an enlarged end portion 80a having three O-rings 82 which provide a slip seal between sleeve 80 and concentric sleeve 76. In addition, sleeve 76 includes an enlarged end portion 76a having O-rings 84 which provides a slip seal between sleeve 76 and outer sleeve 78.

A cylindrical oxygen conduit 86 is concentrically mounted about pipe 74 to form an oxygen flow passage 88 therewith and extends from a flared end 90 disposed generally adjacent the interface between housing section 10 and housing section 12 longitudinally to the nozzle structure 66. The flared end 90 of the oxygen conduit 86 forms a tapered restriction 90a for directing the flow of oxygen into oxygen flow passage 88. The nozzle structure 66 is provided with an internal annular portion 92 having an approximate U-shaped configuration 96 through which an outlet 96 is provided in fluid communication with an oxygen nozzle 98 forming the oxygen injection outlet 68. The outer lip portion 100 of nozzle annular section 96 is welded to the end of oxygen conduit 86, while the inner lip portion 102 is welded to a portion of the end of pipe 74. The end 90 of oxygen conduit 86 is affixed by welding to a ring 104 having a pair of externally mounted O-rings 106 that forms a slip joint with sleeve 108. The sleeve 108 is retained by the internal edges of annular plates 20 and 30 by welds. The mounting of the sleeve ring 104 and end 90 of the oxygen conduit 86 isolates the chamber 26 within housing section 10 from the portion of chamber 36 surrounding the oxygen conduit 86 to separate the oxygen flow from the coolant flow as which will be apparent.

A water coolant pipe 110 is concentrically arranged about a portion of oxygen conduit 86 to form a coolant circulating chamber 112 and an outer concentric coolant outlet chamber 114. One end of the coolant conduit 110 is mounted in fixed relationship on the interior edge of annular plate 40 of housing section 14 and to annular plate 54 in conjunction with a suitable gasket. The other end of the coolant conduit 110 is retained by a slip joint formed by sleeve 116 suitably welded to the nozzle structure 66. The nozzle structure 66 is formed with a coolant nozzle inlet 118 in fluid communication with coolant chamber 112 and includes a passageway 120 concentrically arranged through the nozzle structure 66. An outlet passage 122 is formed in fluid communication with passageway to return coolant through the coolant outlet chamber 114.

In operation, a flow of carbon or other fine-grain solid material useful in the steelmaking process is established through conduit 72 from a conventional source (not shown). The flow of the carbon is carried by a suitable carrier gas of conventional type, such as compressed air, nitrogen, or argon, through the conduit 72 for ejection from outlet 70. A source of oxygen (not shown) is in communication with inlet pipe 24 and delivers a flow of oxygen through chamber 26 and oxygen conduit 86 for injection from the nozzle outlet 68. It is intended that the flow rate of oxygen be supersonic and attain a velocity of Mach 1.5 to 2.3. As is apparent from FIG. 2, the oxygen nozzle directs the oxygen stream from outlet 68 at an angle outward from the axial direction of the lance assembly 2 whereas the flow of carbon from outlet 70 is co-axial with the longitudinal axis of the lance assembly 2 in a manner that the two flows impinge on the molten bath at separate spaced areas of the slag layers. A source of coolant such as water is introduced through inlet pipe 34 into chamber 36 and downward through the cooling chamber 112 between the oxygen conduit 86 and the coolant conduit 110. The flow of coolant is directed through the nozzle passageway 120 around the nozzle and through outlet 122 for introduction into coolant outlet chamber 114. The pipe 44 within housing section 14 acts as an outlet for the coolant in a conventional manner.

The upper housing assembly 6 is supported by conventional support assemblies not shown for mounting within an electric furnace of conventional design, such as in a 100 ton vessel, with the outlet 68 being beneath outlet 70. The flow of carbon 70 being ejected from outlet 70 is optimumly disposed at an angle of 25 to 40 degrees with respect to the top of the molten bath. The outlet of supersonic oxygen flow from nozzle 68 is then angularly disposed at angles from 45 to 55 degrees with respect to the top surface of the molten bath, such that the flow of the oxygen does not intersect with the flow of the carbon above the surface of the molten bath. As previously described, the supersonic stream of oxygen impinges upon the slag with deep penetration to create a series of waves throughout the molten bath to create a bath reaction and for enhanced efficiency, but prevents temperature stratification within the bath and homogenizes the molten steel. In addition, excess oxygen striking the slag is released from the impact dimple in the slag and combines with the carbon to create initially carbon monoxide and consequently carbon dioxide for emulsifying the slag into a foam for greater electrical efficiency and improved metallurgical-reactions. The lance assembly 2 is intended to direct the carbon stream to an area towards the center of the molten bath above which the delta arrangement of electrodes is conventionally positioned. It has been found that superior efficiency can be attained by directing the oxygen flow to an impact area which is located at a distance approximately one-third of the overall diameter of the molten bath from the vessel wall. The conditions in the electric furnace cause thermal expansion of the barrel 4 with respect to the internal carbon and oxygen conduits 72 and 86. The slip joint 116, as well as the slip joints created by O-rings 106, 82, and 84, allow slippage between the conduits such that expansion can be accommodated internally without damage to the lance structure.

An elastomeric annular shut off valve 124 of the invention is affixed to the oxygen conduit 86 to be responsive to failure or burning off of the nozzle structure. The elastomeric shut off valve 124 includes a tapered leading edge portion 126 in a truncated cone configuration and is arranged to be moved during separation of the nozzle structure 66 from the barrel 4 into a cut off mode seated against the end of water conduit 110 as shown in phantom in FIG. 2. Such action isolates the coolant water being introduced through water inlet 34 to automatically cut off its supply to coolant chamber 112 with minimal coolant being directed into the molten bath. A plurality of pins 128 are welded concentrically about the end portion of pipe 74. The pins 128 move with the pipe 74 upon separation of the nozzle structure 66 and are designed to the wedge against the surface of restriction 90 of the oxygen conduit 86 to prevent further movement between the parts.

Referring to FIG. 3, there is illustrated a second embodiment of the improved oxygen/carbon blowing lance assembly of the invention, generally designated by reference numeral 200. Lance assembly 200 operates in similar manner as the previously described embodiment shown in FIGS. 1 and 2. The lance assembly 200 includes an elongated hollow metal barrel 204 mounted in fluid communication with a metal housing assembly 206. An oxygen/carbon injection nozzle structure 208 is suitably supported at the opposite end of the barrel 204.

The housing assembly 206 includes three substantially identical modular housing sections 210, 212, and 214. The housing element 210 includes a metal cylindrical pipe section 216 having a pair of annular plates 220 and 222 mounted by welding at each end. The plates 220 and 222 form annular projecting flanges in which a plurality of bolt holes 222a, 220a are concentrically arranged about the pipe section. A laterally arranged oxygen inlet pipe 224 is welded to the wall of pipe section 216 in fluid communication with the chamber 226 formed by the pipe section 218.

The housing section 212 is formed by a metal pipe section 228 having a pair of annular plates 230 and 232 welded at each end. A water coolant inlet pipe 234 is laterally affixed to the pipe section 228 and is in fluid communication with the chamber 236 formed by pipe section 228. Housing section 214 includes a metal pipe section 238 having a pair of annular plates 240 and 242 suitably welded at each end. The annular plates 230 and 232 of housing section 212 include a plurality of bolt openings 230a and 232a circumferentially arranged about the pipe section 238. The annular plates 240 and 242 of housing section 214 also include a plurality of bolt holes 240a, 242a circumferentially arranged about the pipe section 238. A lateral coolant outlet pipe 244 is affixed to the pipe section 238 in fluid communication with the chamber 246 formed by the housing section 214.

The base plate 222 of housing section 210 is affixed to a pair of annular plates 248 and 250 each having bolt holes 250a and 250b arranged to be in alignment with bolt hole 222a for affixing annular plates 222, 248, and 250 in contacting relationship through suitable fastener elements, such as bolt assemblies (not shown). An annular plate 252 is sandwiched between the flanges formed by plates 220 and 230 at the interface between housing sections 210 and 212 and includes a plurality of bolt holes 252a in alignment with bolt holes 220a and 230a for receiving fastener elements, such as bolt assemblies (not shown).

An additional annular plate 254 is imposed between the flanges formed by annular plates 232 and 240 at the interface between housing sections 212 and 214 and possesses bolt holes 254a in alignment with bolt holes 232a and 240a for affixing the three plates together by suitable fastener elements, such as a bolt assembly (not shown). The annular plate 242 is affixed to an annular plate 258 that is welded to the end of barrel 204. The plate 258 possesses concentrically arranged bolt holes 258a disposed in alignment with bolt holes 242a for receiving fastener elements, such as bolt assembly (not shown), to affix annular plate 242 to the barrel plate 258. From the foregoing it should be apparent that the diameter of the pipe sections 218, 228, and 238 are identical to each other and that the plates 220, 222, 230, 232, 240, and 242 are substantially identical in construction and configuration.

The barrel 204 comprises an elongated metal pipe 262 having a diameter less than the diameter of pipe section 238 of the manifold section 214 and is welded to the internal edge 264 of the housing plate 258. A nozzle structure 266 is affixed to the free end of barrel 204 and forms an oxygen injection nozzle outlet 268 and a carbon injection outlet 270. A carbon injection conduit 272 extends the length of the lance assembly 200 from a point beyond top plate 250 to the nozzle outlet 270 along the longitudinal center line of the upper housing assembly 206 and the barrel 204.

The end of pipe 272 within housing section 210 is integrally affixed to an internal sleeve 276 which is capable of relative movement within an outer sleeve 278. The outer sleeve 278 is integrally affixed to annular plate 248 and extends into housing chamber 226 to a position slightly beyond the end of pipe 272. An inlet pipe 280 is concentrically disposed within internal sleeve 276 in fixed welded support on annular plate 250. The sleeve 280 includes an enlarged end portion 280a having three O-rings 282 which provide a slip seal between sleeve 280 and concentric sleeve 276. In addition, sleeve 276 includes an enlarged end portion 276a having O-rings 284 which provides a slip seal between sleeve 276 and outer sleeve 278.

A cylindrical oxygen conduit 286 is concentrically mounted about pipe 272 to form an oxygen flow passage 288 therewith and extends from flared end 290 disposed generally adjacent the interface between housing section 240 and housing section 212 longitudinally to the nozzle structure 266. The nozzle structure 266 is provided with an internal annular portion 292 through which an outlet 296 is provided in fluid communication with an oxygen nozzle 298 forming the oxygen injection outlet 268. The outer lip portion 300 of nozzle annular section 296 is welded to the end of oxygen conduit 286, while the inner lip portion 302 is welded to a portion of the end of pipe 274. The end 290 of oxygen conduit 286 is affixed by welding to a ring 304 having a pair of externally mounted O-rings 306 that forms a slip joint with sleeve 308. The sleeve 308 is retained by the internal edges of annular plates 220 and 230 by welds. The mounting of the sleeve ring 304 and end 290 of the oxygen conduit 286 isolates the chamber 226 within housing section 210 from portion of chamber 236 surrounding the oxygen conduit 286 to separate the oxygen flow from the coolant flow as which will be apparent.

A water coolant pipe 320 is concentrically arranged about a portion of oxygen conduit 286 to form a coolant circulating chamber 312 and an outer concentric coolant outlet chamber 314. One end of the coolant conduit 320 is mounted in fixed relationship on the interior edge of annular plate 240 of housing section 214 and to annular plate 254 in conjunction with a suitable gasket. The other end of the coolant conduit 310 is retained by a slip joint formed by sleeve 316 suitably welded to the nozzle structure 266. The nozzle structure 266 is formed with a coolant nozzle inlet 318 in fluid communication with coolant chamber 312 and includes a passageway 320 concentrically arranged through the nozzle structure 266. An outlet passage 322 is formed on fluid communication with passageway to return coolant through the coolant outlet chamber 314. Four safety bars 350 and 360 are respectively affixed within conduit 286 and conduit 320 as stops to prevent damage.

What is claimed:

1. A steelmaking lance assembly comprising:
   a housing;
   an elongated hollow barrel attached to said housing, said hollow barrel having a free end, a nozzle mounted on said free end and having a pair of outlets for directing a flow to a molten bath within a steelmaking vessel; and
   coolant conduit means operatively arranged internally within said housing and said barrel for circulating a flow of coolant, said coolant conduit means including coolant shut off means internally of said housing for blocking said flow of coolant through said barrel upon failure of said nozzle.

2. The lance assembly according to claim 1 wherein said coolant shut off means is a valve element.

3. The lance assembly according to claim 2 further comprising a first and second concentric conduits extending through said housing and said barrel respectively in fluid communication with said first and second outlets, said valve element being mounted on the outer one of said first and second conduits.

4. The lance assembly according to claim 3 wherein said coolant conduit means forms a coolant passage concentrically arranged about said outer one of said first and second conduits.

5. The lance assembly according to claim 4 wherein said valve element blocks said passage against flow of coolant upon movement of said outer one of said first and second conduits relative to said barrel.

6. The lance assembly according to claim 5 wherein said valve element includes a tapered end for contacting a portion of said coolant conduit means to block said passage.

7. A lance assembly for steelmaking comprising:
   a housing;
   an elongated barrel attached to said housing, said barrel having a nozzle at one end forming outlet means; and
   said housing including a plurality of generally identically configured housing elements forming in line pipe sections of said housing, said housing elements including means for permitting said housing elements to be interchangeable with each other to facilitate maintenance of said lance assembly.

* * * * *